(12) United States Patent
Taheri et al.

(10) Patent No.: US 10,235,724 B2
(45) Date of Patent: Mar. 19, 2019

(54) ENERGY EFFICIENT HOT WATER DISTRIBUTION

(71) Applicant: INTERNATIONAL BUSINESS MACHINES CORPORATION, Armonk, NY (US)

(72) Inventors: Nicole A. Taheri, Dublin (IE); Tigran Tchrakian, Dublin (IE); Jia Yuan Yu, Montreal (CA); Sergiy Zhuk, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

(21) Appl. No.: 15/170,063

(22) Filed: Jun. 1, 2016

(65) Prior Publication Data

US 2017/0351277 A1 Dec. 7, 2017

(51) Int. Cl.
*G05D 23/19* (2006.01)
*F24H 9/20* (2006.01)
*G06Q 50/06* (2012.01)

(52) U.S. Cl.
CPC .......... *G06Q 50/06* (2013.01); *F24H 9/2007* (2013.01); *G05D 23/1919* (2013.01)

(58) Field of Classification Search
CPC ... F24H 9/2007; G05D 23/1923; G06Q 50/06
See application file for complete search history.

(56) References Cited

U.S. PATENT DOCUMENTS

| 3,838,813 | A | * | 10/1974 | Brosenius | ............. F24D 10/006 237/13 |
| 4,228,006 | A | | 10/1980 | Hanna | |
| 4,339,930 | A | * | 7/1982 | Kirts | ................... F24D 19/1075 126/585 |
| 4,606,325 | A | | 8/1986 | Lujan | |

(Continued)

FOREIGN PATENT DOCUMENTS

| CN | 203475529 U | 3/2014 | |
| JP | 2010014381 A | * 1/2010 | ............. F24D 17/00 |

OTHER PUBLICATIONS

U.S. Department of Energy, "Tankless or Demand-Type Water Heaters," Energy.gov website (http://energy.gov/energysaver/articles/tankless-or-demand-type-water-heaters).

(Continued)

*Primary Examiner* — Kenneth M Lo
*Assistant Examiner* — Chad G Erdman
(74) *Attorney, Agent, or Firm* — Intelletek Law Group, PLLC; Gabriel Daniel, Esq.

(57) ABSTRACT

A method and system of providing hot water efficiently. A cost of heating a volume of water to a predetermined temperature in a first water heater is determined. A cost of transferring a volume of hot water from a second water heater of a network of interconnected water heaters to the first water heater is determined. Upon determining that the cost of transferring the volume of hot water from the second water heater is lower than the cost of heating the volume of water of the first water heater, the second water heater transfers at least part of the volume of hot water to the first water heater. Otherwise, the volume of water is heated to the predetermined temperature in the first water heater.

17 Claims, 5 Drawing Sheets

(56) References Cited

U.S. PATENT DOCUMENTS

| | | | |
|---|---|---|---|
| 4,955,207 | A | 9/1990 | Mink |
| 5,040,725 | A * | 8/1991 | Butler .................. F24D 19/1009 165/11.1 |
| 5,655,710 | A | 8/1997 | Kayahara et al. |
| 5,944,221 | A | 8/1999 | Laing et al. |
| 6,161,100 | A | 12/2000 | Saar |
| 6,286,764 | B1 * | 9/2001 | Garvey ................. G05D 7/0635 236/12.12 |
| 6,668,915 | B1 * | 12/2003 | Materna ..................... F28F 1/10 165/146 |
| 7,058,457 | B2 * | 6/2006 | Kuwahara ............... G05B 15/02 700/11 |
| 8,271,143 | B2 | 9/2012 | Deivasigamani et al. |
| 2007/0130093 | A1 * | 6/2007 | Haji-Valizadeh ......... E03B 7/02 705/413 |
| 2008/0155905 | A1 | 7/2008 | Willbanks |
| 2012/0055419 | A1 * | 3/2012 | Beyerle .................. F24D 11/004 122/14.1 |
| 2012/0060829 | A1 * | 3/2012 | DuPlessis .............. F24D 11/003 126/609 |
| 2012/0205456 | A1 * | 8/2012 | Honma ................ F24D 19/1048 237/2 B |
| 2012/0271465 | A1 | 10/2012 | Zobrist et al. |
| 2012/0285441 | A1 | 11/2012 | Staroselsky |
| 2013/0019858 | A1 | 1/2013 | Wieland |
| 2013/0025301 | A1 * | 1/2013 | Maitani ................ F24D 11/0214 62/79 |
| 2013/0211745 | A1 | 8/2013 | Jaeger |
| 2014/0083460 | A1 * | 3/2014 | McDonald ........... A47L 15/0047 134/18 |
| 2014/0137591 | A1 * | 5/2014 | Rutherford ................ F24F 3/06 62/324.1 |
| 2014/0257584 | A1 * | 9/2014 | Tanimoto ................ G06Q 50/06 700/291 |
| 2014/0260392 | A1 * | 9/2014 | Hawkins ............... F25B 29/003 62/238.6 |
| 2014/0326004 | A1 * | 11/2014 | Leman .................... F25B 13/00 62/79 |
| 2015/0019027 | A1 | 1/2015 | Acker et al. |
| 2015/0096505 | A1 * | 4/2015 | Deivasigamani ... F24D 17/0026 122/14.2 |
| 2016/0187028 | A1 * | 6/2016 | Shimada ............... F24H 9/2035 122/14.21 |
| 2016/0370125 | A1 * | 12/2016 | Gilbert .................... H02J 15/00 |

OTHER PUBLICATIONS

Bryant, Charles W., "How Tankless Water Heaters Work," How Stuff Works website (http://home.howstuffworks.com/tankless-water-heater3.htm).

Kalogiroua et al., "Hybrid PV/T Solar Systems for Domestic Hot Water and Electricity Production," Energy Conversion and Management, 4(18-19):3368-338, 2006.

Klenck, Thomas, "How It Works: Water Heater," Popular Mechanics website (http://www.popularmechanics.com/home/interior-projects/how-to/a153/1275141/), Aug. 31, 1997.

Li et al., "Experimental Studies on a Solar Powered Air Conditioning System with Partitioned Hot Water Storage Tank," Solar Energy, 71(5):285-297, 2001.

Smith et al., "Control of a Two-Tank System," MathWorks website (http://www.mathworks.com/help/robust/examples/control-of-a-two-tank-system.html?s_tid=gn_loc_drop#responsive_offcanvas).

U.S. Department of Energy, "Sizing a New Water Heater," Energy. gov website (http://energy.gov/energysaver/articles/sizing-new-water-heater) May 29, 2012.

Best Plumbers, "Advantages and Disadvantages of Tankless Water Heaters," Best Plumbers website (https://bestplumbers.com/advantages-and-disadvantages-of-tankless-water-heaters/).

Rapid Tables, "BTU to kWh Conversion," Rapid Tables website (http://www.rapidtables.com/convert/energy/BTU_to_kWh.htm).

Energy Insights for Business and Industry, "Calculating BTU Requirements to Heat Water," SCE&G website (http://www.scegbusiness.com/Article.aspx?userID=351124&articleID=1397).

Bonkers.ie, "Gas and Electricity Help Centre: Common Electricity Questions," Bonkers.ie. website (http://www.bonkers.ie/compare-gas-electricity-prices/help/).

DIY Doctor: The Home Improvement Hub, "Hot Water Systems—A DIY Guide to Different Domestic Heating and Hot Water Systems with Common Faults and How to Cure Them," DIY Doctor website (http://www.diydoctor.org.uk/projects/domestic_hot_water_systems_htm).

Engineering Toolbox, "Pumping Water—Required Horsepower," Engineering ToolBox website (http://www.engineeringtoolbox.com/pumping-water-horsepower-d_753.html).

Green Riverside, "Tankless or On-Demand Water Heaters," Energy Depot website (http://www.energydepot.com/RPUres/library/TLwaterheater.asp).

Middle School Chemistry, "Temperature Affects Density," American Chemical Society—Middle School Chemistry website (http://www.middleschoolchemistry.com/lessonplans/chapter3/lesson6) 2015.

Exploratorium, "The Amazing Water Trick: Do Hot and Cold Water Mix?," Exploratorium website (https://www.exploratorium.edu/science_explorer/watertrick.html) 1998.

Online Conversion, "What is the Final Temperature After Mixing?," Online Conversion website (http://www.onlineconversion.com/mixing_water.htm).

* cited by examiner

ENERGY EFFICIENT HOT WATER DISTRIBUTION

BACKGROUND

Technical Field

The present disclosure generally relates to water heaters, and more particularly, to distribution of hot water between water heaters to increase energy efficiency.

Description of the Related Art

Water is typically heated in vessels, sometimes referred to as water heaters, tanks, or boilers, which heat a volume of water to a preset temperature. These water heaters may be in the form of a cylindrical vessel or container that provides hot water upon demand. In various configurations, these tanks may be ON in default (to provide a continuous supply of hot water), or turned ON in anticipation of a demand for hot water (e.g., before taking a shower) and turned OFF thereafter. When the amount of hot water that is used is less than the amount heated, the remaining hot water gradually cools in the water heater, thereby losing energy. It is with respect to these considerations and others that the present disclosure has been written.

SUMMARY

According to an embodiment of the present disclosure, a computing device has an application, wherein execution of the application configures the computing device to perform various acts. A request for a volume of hot water for a first water heater is received. A cost of heating a volume of water to a predetermined temperature in the first water heater is determined. A cost of transferring the volume of hot water from a second water heater of a network of interconnected water heaters to the first water heater is also determined. Upon determining that the cost of transferring the volume of hot water from the second water heater is lower than the cost of heating the volume of water in the first water heater, a request is sent to the second water heater to transfer at least part of the volume of hot water to the first water heater. Further, a notification is sent to the first water heater indicative that the first water heater will receive at least part of the volume of hot water from the second water heater. However, upon determining that the cost of transferring the hot water from the second water heater is equal to or higher than the cost of heating the volume of water of the first water heater, a notification is sent to the first water heater to heat the volume of water of the first water heater to the predetermined temperature.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to water heaters, and more particularly, to distribution of hot water between water heaters to increase energy efficiency. There is a network of interconnected water heaters that are in communication with a central server. When a request for hot water is received from a water heater, the central server determines a cost of heating the water locally versus transferring hot water from another interconnected water heater that has excess hot water. The hot water is then accommodated in an energy efficient way based on the cost comparison.

Reference now is made in detail to the examples illustrated in the accompanying drawings and discussed below.

Example Architecture

Figure 1:
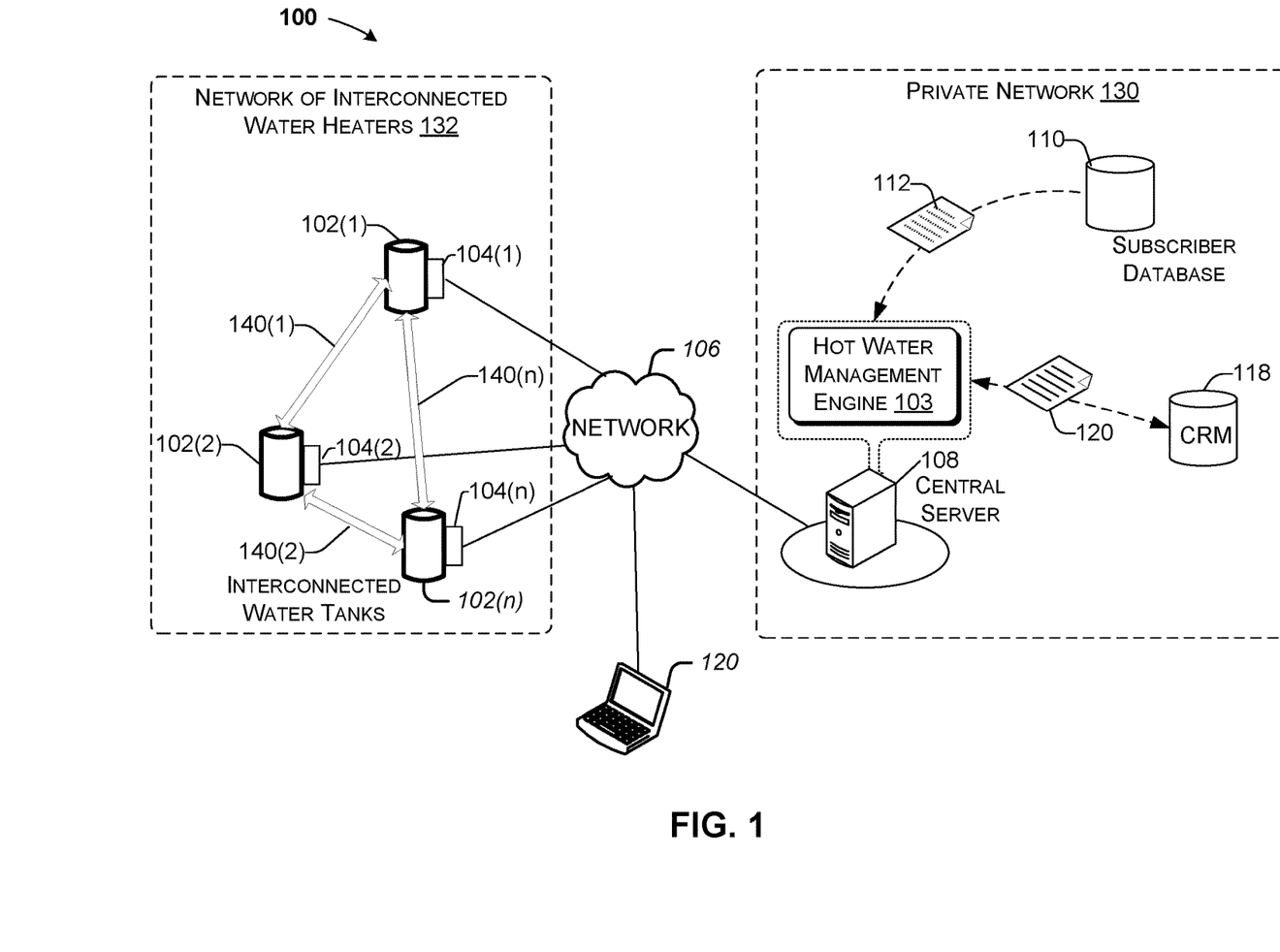
FIG. 1 illustrates an example architecture for implementing an energy efficient hot water fulfillment system.

FIG. 1 illustrates an example architecture 100 for implementing an energy efficient hot water fulfillment system. Architecture 100 includes a network 132 of water heaters 102(1) to 102(n) that are interconnected via pipes 140(1) to 140(n). For example, each water heater 102(1) to 102(n) may support its corresponding housing unit (e.g., an apartment, attached home, or closely placed home) with hot water. Each water heater 102(1) to 102(n) may include a controller device 104(1) to 104(n), respectively, which is configured to perform various functions to provide hot water to its corresponding housing unit in an energy efficient way. For example, some of the functions of the controller device 104(1) may include monitoring the temperature of the water in its corresponding water heater 102(1) at one or more positions in the water heater (e.g., top, middle, and/or bottom), receiving a request for hot water for its corresponding housing unit, receiving a request for hot water for other water heaters (e.g., 102(2) to 102(n)), sending a request for hot water to receive hot water from another water heater of the network 132 of interconnected water heaters (e.g., 102(2) to 102(n)), determining a volume of hot water in the corresponding water heater, sending a notification that excess hot water is available, etc. As used herein, a controller device is considered to be part of its corresponding water heater. Accordingly, when a water heater sends or receives a message, it will be understood that these functions are performed by its corresponding controller device.

Architecture 100 includes a network 106 that allows various water heaters 102(1) to 102(n) to communicate with each other, as well as any other components that are connected to the network 106, such as a computing device 120 and a central server 108. The network 106 may be, without limitation, a local area network ("LAN"), a virtual private network ("VPN"), a cellular network, or the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows users of the energy efficient hot water fulfillment system to send information to and receive information from a private network 130.

The private network 130 includes a hot water management engine 103 (e.g., a program) that is executed on a central server 108. The central server 108 may include one or more general purpose computers, such as desktop computers, tablet computers, laptop computers, servers, or other electronic devices that are capable of receiving data packets, processing the data packets, and generating output data. In other embodiments, the central server 108 represents virtual computing devices in the form of virtual machines or software containers that are hosted in a cloud. Accordingly, while a single central server 108 is illustrated, it will be understood that the functions of the central server 108 may be implemented in a distributed fashion on a number of similar platforms, to distribute the processing load. The central server 108 is discussed in more detail later.

The hot water management engine 103 is configured to receive messages in the form of digital data packets from various controller devices 102(1) to 102(n) to receive requests for hot water and/or notifications that excess hot water is available for distribution. In some embodiments, the request for hot water from a controller device includes a volume and/or temperature of the requested hot water. For example, the requestor water heater 102(1) may already have a partial volume of hot water. In this regard, the controller device 104(1) may determine a difference required and request that amount from the hot water management engine 103 of the central server 108. In various embodiments, the notification from the various controller devices as to whether excess hot water is available may be received by the hot water management engine 103 as a status report at periodic intervals or as soon as excess hot water is identified to be available by its corresponding controller device.

The hot water management engine 103 of the central server 108 may also receive contextual information 112 from a subscriber database server 110. In various embodiments, the subscriber database server 110 may be part of the private network 130 or external therefrom and configured to communicate to the central server 108 via the network 106. The contextual information 112 provided by the subscriber database server 110 may be used to calculate a cost (e.g., energy) of transferring hot water from one water heater to another water heater of the network of interconnected water heaters 132.

For example, the location (e.g., spatial coordinates) of the water heater, the volume of the water heater, model of the water heater, etc., may be stored in the subscriber database server 110. Thus, the contextual information 112 provided by the subscriber database server 110 may be used, for example, to determine a distance in each dimension between a transferor water heater 102(1) and a requestor water heater, a cost (e.g., amount of energy) that it may take to transport the hot water from the transferor water heater to the requestor water heater, and an amount of energy that may be lost during the transfer due to the heat absorption of the pipes due to conduction. For example, a distance segment between a transferor water heater and a requestor water heater that is in the vertically up direction is associated with a substantially larger energy loss than that of a vertically down segment. In one embodiment, the water heater that is identified to have excess hot water and has the lowest cost (e.g., energy) in transferring its hot water to a requestor water heater is selected by the hot water management engine 103 to provide the hot water if the transfer of the hot water is more energy efficient than heating the requested volume of water locally at the requestor water heater.

In one embodiment, the private network 130 may include a Customer Relationship Manager (CRM) server that offers its account holders (e.g., subscribers of the water heaters in the network of interconnected water heaters 132) on-line access to a variety of information 120 related to the account holders' account, such as on-line payment information, subscription changes, amount of hot water the subscribed water heater has received from other water heaters in the network of interconnected water heaters 132, the amount of water (hot and/or cold) its corresponding water heater has transferred to another water heater in the network of interconnected water heaters 132, the amount of energy it has saved in comparison to a standalone water heater, password control, etc. In one embodiment, the CRM 118 provides an incentive (e.g., payback) based on the volume of hot water that a water heater has transferred to another water heater in the network of interconnected water heaters 132. Incentives may be in various form, such as financial credit and/or priority in receiving hot water of the network of interconnected water heaters when multiple water heaters request hot water at a similar time. For example, an account holder may retrieve such information 120 from the CRM server 118 via various networks, such as network 106, via a computing device 120.

In one embodiment, the hot water management engine 103 is also configured to determine one or more appropriate controller devices (e.g., 102(1) to 102(n)) that could fulfill the request for the hot water. To that end, the hot water management engine 103 may store notifications from controller devices 104(1) to 104(n) that indicate that their water heater (e.g., 102(1) to 102(n)) has excess hot water. In various embodiments, the availability of excess hot water may be identified by a controller device (e.g., 104(1)) by receiving a notification from a user of the water heater (e.g., by the user physically flipping a switch, and/or sending a notification to the controller via a computing device 120 over the network 106). In one embodiment, the availability of excess hot water is determined by sensor(s) associated with the water heater, discussed in more detail later.

In various embodiments, the central server 108, subscriber database server 110, and the CRM server 118 can be stand-alone servers, combined on a single server, or hosted in a cloud.

Example Controller Device

Figure 2:
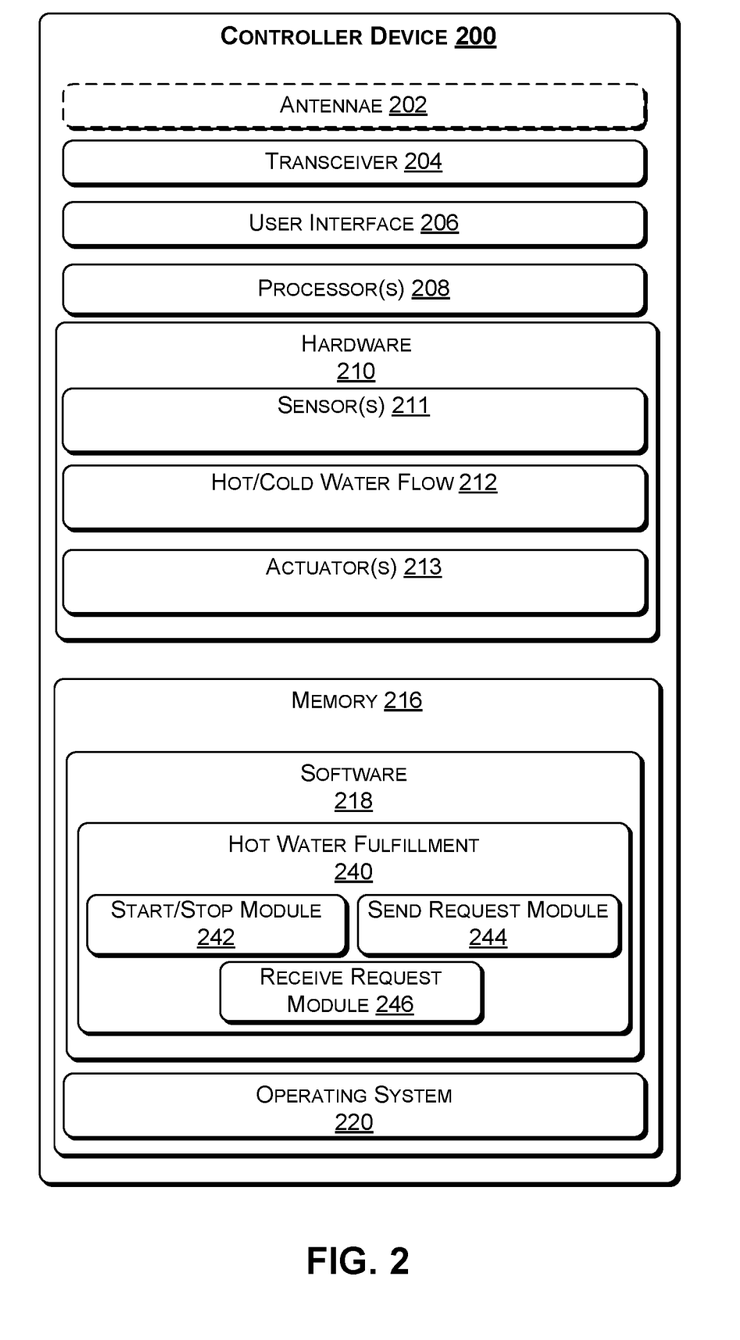
FIG. 2 illustrates a block diagram showing various components of an illustrative controller device at a high level, consistent with an exemplary embodiment.

As discussed in the context of FIG. 1, the energy efficient hot water fulfillment system depicted in the architecture 100 involves several controller devices. To that end, FIG. 2 illustrates a block diagram showing various components of an illustrative controller device 200 at a high level. For discussion purposes, the illustration shows the controller device 200 in the form of a wireless computing device with various sensors.

The controller device 200 may include one or more antennae 202; a transceiver 204 for cellular, Wi-Fi communication, and/or wired communication; a user interface 206; one or more processors 208; hardware 210; and memory 216. In some embodiments, the antennae 202 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 204, sometimes collectively referred to as a network interface, which is configured to receive and transmit digital data. In one embodiment, the controller device 200 does not include an antenna 202 and communication with external components is via wired communication.

In one embodiment, the controller device 200 includes a user interface 206 that enables a user to provide input and receive output from the controller device 200. For example, the user interface 206 may include a data output device (e.g., visual display, audio speakers, haptic device, etc.) that may be used to display notifications from the hot water management engine 103 of the central server 108. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces. In various embodiments, the data input devices may be used to enter a request for hot water and/or to indicate that hot water is no longer needed.

The controller device 200 may include one or more processors 208, which may be a single-core processor, a multi-core processor, a complex instruction set computing (CISC) processor, or another type of processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may further include hardware decoders and encoders, a network interface controller, and/or a universal serial bus (USB) controller.

The hardware 210 may also include various sensors 211, such as one or more thermostats that may be at different positions of the water heater. For example, there may be a thermostat at the top of the water heater operative to control the temperature at the top and a second thermostat at the bottom of the water heater operative to control the temperature at the bottom. The difference in temperature between the upper thermostat and the lower thermostat may indicate the volume of water that should be heated.

In one embodiment, the hardware 210 may include one or more actuators 213 to open/shut valves such that hot water is able to be received and/or transferred from one water heater (e.g., 102(1)) to a second water heater (e.g., 102(n)).

In one embodiment, there may be a hot and/or cold water flow sensor(s) 212 that may be used to determine whether excess hot water is available. For example, upon determining that the hot water flow during a predetermined time period has dropped below a threshold volume (e.g., hot water has not been used in the past 10 minutes), the hot water flow sensor 212 may help identify that hot water is no longer required and can therefore be made available to other hot water heaters in the network of interconnected water heaters. In one embodiment, the water flow sensor 212 may also calculate the volume of cold water that has been extracted during the receipt of the hot water from another hot water heater. Accordingly, the cold water that is replaced by the received hot water may be inferred by the volume of hot water received. Alternatively, the cold water that is replaced is directly measured by a cold water flow sensor 212.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components or modules that are executable or accessible by the processor(s) 208 and controller(s) of the controller device 200. The various components of the memory 216 may include software 218 and an operating system 220. Each module may include routines, program instructions, objects, and/or data structures that perform particular tasks or implement particular abstract data types.

For example, the software 218 of the memory 216 may include a hot water fulfillment application 240 that is operative to perform various functions, including functions of interacting with the hot water management engine 103 of the central server 108. To that end, the hot water fulfillment application 240 may include a "start/stop hot water request" module 242 that user of the water heater (e.g., 102(1)) may activate to indicate a request for hot water (e.g., before taking a shower). The same module 242 may be used to indicate that hot water is no longer required (e.g., after taking a shower). There may be a "send request for hot water" module 244 that is configured to send a request to the hot water management engine 103 of the central server 108 for hot water, such that the feasibility of obtaining hot water from one or more other hot water heaters of the network of interconnected water heaters is determined. There may be a "receive request for hot water" module 246 that is configured to receive a request for hot water from the hot water management engine 103, such that the present water heater (e.g., 102(1)) can transfer its excess hot water to the requestor hot water heater.

The operating system 220 may include components that enable the controller device 200 to receive and transmit data via various interfaces (e.g., user controls, communication interface, and/or memory input/output devices), as well as process data using the processors 208 to generate output. The operating system 220 may include a presentation component that presents the output (e.g., display the data on an electronic display of the controller device 200, store the data in memory 216, transmit the data to another electronic device, etc.). Additionally, the operating system 220 may include other components that perform various additional functions generally associated with an operating system 220.

Example Interconnected Water Heaters

Figure 3:
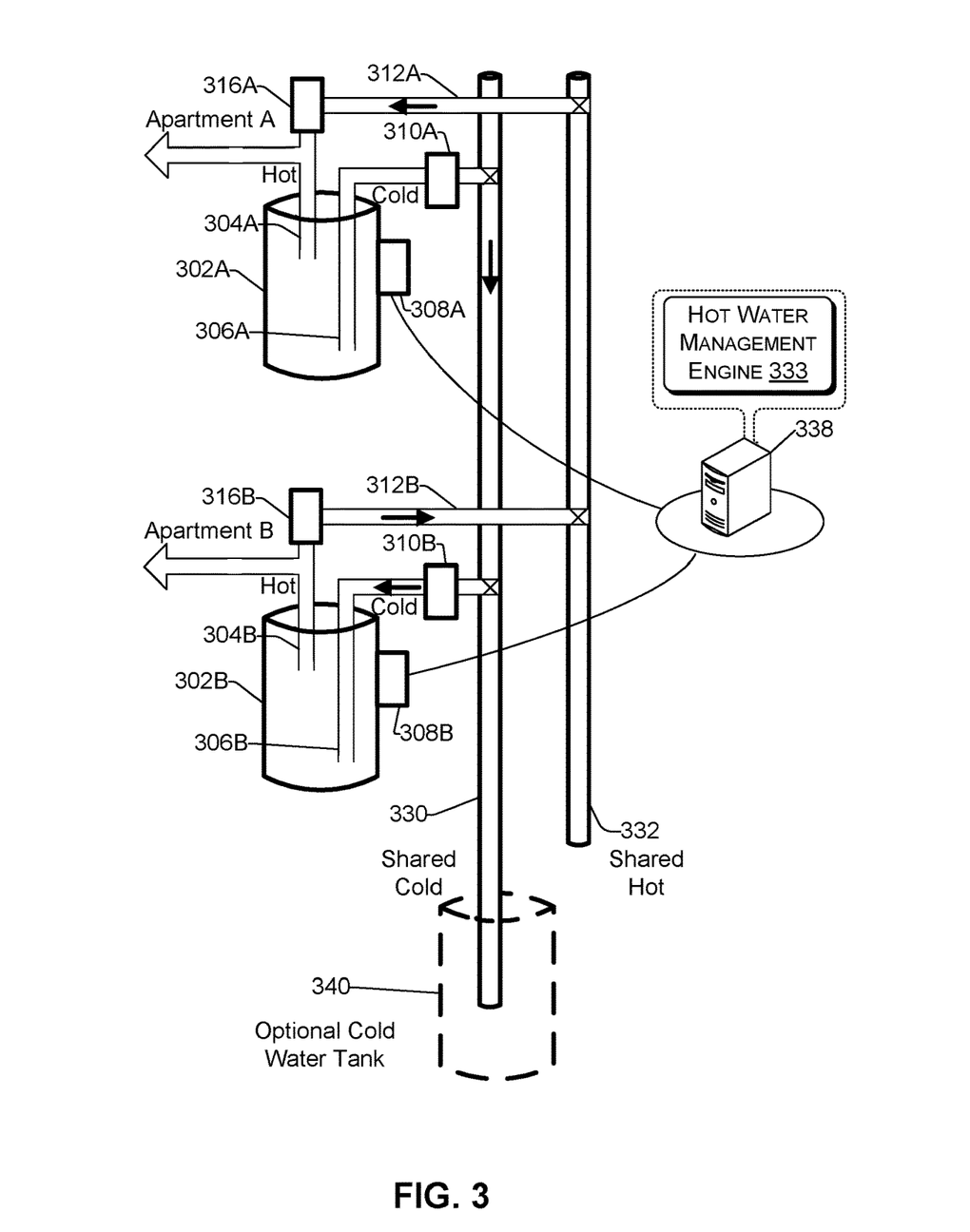
FIG. 3 illustrates an example system of interconnected water heaters.

FIG. 3 illustrates an example system 300 of interconnected water heaters. By way of example and not limitation, system 300 illustrates a first water heater 302A that is interconnected with a second water heater 302B via shared cold and hot pipes 330 and 332. The first water heater 302A includes a cold water pipe 306A and a hot water pipe 304A. Typically, the hot water pipe 304A has an opening that is higher up in the water heater 306A than the cold water pipe 306A because hot water rises. The first water heater 302A further includes a controller device 308A similar to controller device 200 of FIG. 2.

In one embodiment, there is no air inside the water heater 302A. When the hot tap is turned ON (e.g., at the kitchen sink or bathroom), available hot water immediately exits from the hot water pipe 304A to the housing unit, represented in the example of FIG. 3 as "Apartment A," until the hot water reaches the faucet. At the same time that hot water is extracted from the hot water pipe 304A, cold water enters the bottom of the water heater 302A through the cold water pipe 306A. There may be a valve 310A that is controlled by controller 308A that may open to receive cold water from the shared cold water pipe 330. In another embodiment, the water heater 302A operates without a cold water valve 310A.

The operation and components of the second water heater 302B are substantially similar to that of water heater 302A and are therefore not repeated for brevity.

By way of example, consider that water heater 302B has hot water that is no longer needed by Apartment B. In various embodiments, the availability of excess hot water may be identified by a controller device 308B by receiving a notification from a user of the water heater 302B or via sensors of the controller device 308B. The availability of excess hot water is communicated to a hot water management engine 333 of a central server 338 in a data packet that includes an identifier of the hot water heater 308B and a time stamp. This data packet is stored in a memory of the central server 338.

When the use of hot water is anticipated by Apartment A, a user may indicate a hot water request via the controller device 308A (such as by simply flipping a switch (e.g., ON) or sending a message thereto via a network, as discussed previously in the context of FIG. 2). In this regard, the controller device 308A sends a message in the form of a data packet to the hot water management engine 333 of the central server 338. In various embodiments, the data packet may include a combination of an identifier of the water heater 306A, a time stamp, and/or a volume of the desired hot water.

Upon receiving the request for hot water, the hot water management engine 333 of the central server 338 may determine that routing the excess hot water of the water heater 302B from Apartment B is less in cost (e.g., energy) than heating the water in the water heater 302A of Apartment A. The hot water management engine 333 (i) sends a message to the requestor controller device 308A that its water heater will be a recipient of excess hot water from transferor hot water heater 302B, and (ii) sends a message to the controller device 308B that it is the transferor of excess hot water to the requestor hot water heater 302A.

To that end, a hot water valve 316B of the transferor hot water heater 302B and a hot water valve 316A of the recipient (i.e., requestor) hot water heater 302A may both open such that hot water is passed from the transferor hot water heater 302B to the requestor hot water heater 302A through a shared hot water pipe 332. In various embodiments, the transfer of hot water may be facilitated by one or more pumps at the requestor end (e.g., water heater 302A) and/or transferor end (e.g., water heater 302B). In one example, using the pump at the requestor end may be preferred to prevent attributing an energy cost to the transferor water heater 302B.

As hot water is passed from the transferor hot water heater 302B to the requestor hot water heater 302A, cold water is removed from the requestor hot water heater 302A. In various embodiments, the cold water may be removed via the cold water pipe 306A or a separate pipe that is dedicated to the extraction of cold water (not shown for purposes of simplicity—but substantially similar to cold water pipe 306A) that is coupled to the shared cold water pipe 330. The cold water that is extracted from the requestor hot water heater 302A may be directly routed to the transferor hot water heater 302B via the shared cold water pipe 330. For example, the cold water valves 310A and 310B may be opened to facilitate the transfer of cold water. In some embodiments, a pump is used (e.g., at the transferor and/or requestor end) to facilitate the transfer of cold water.

In one embodiment, there is a separate cold water tank 340 that is used to collect cold water that has been displaced via the shared cold water pipe 330 when hot water is transferred to the requestor hot water heater (e.g., 302A). While, two water heaters are illustrated in the example of FIG. 3 for reasons of simplicity, it will be understood that additional water heaters are supported as well, based on the concepts discussed herein.

Example Process

Figure 4:
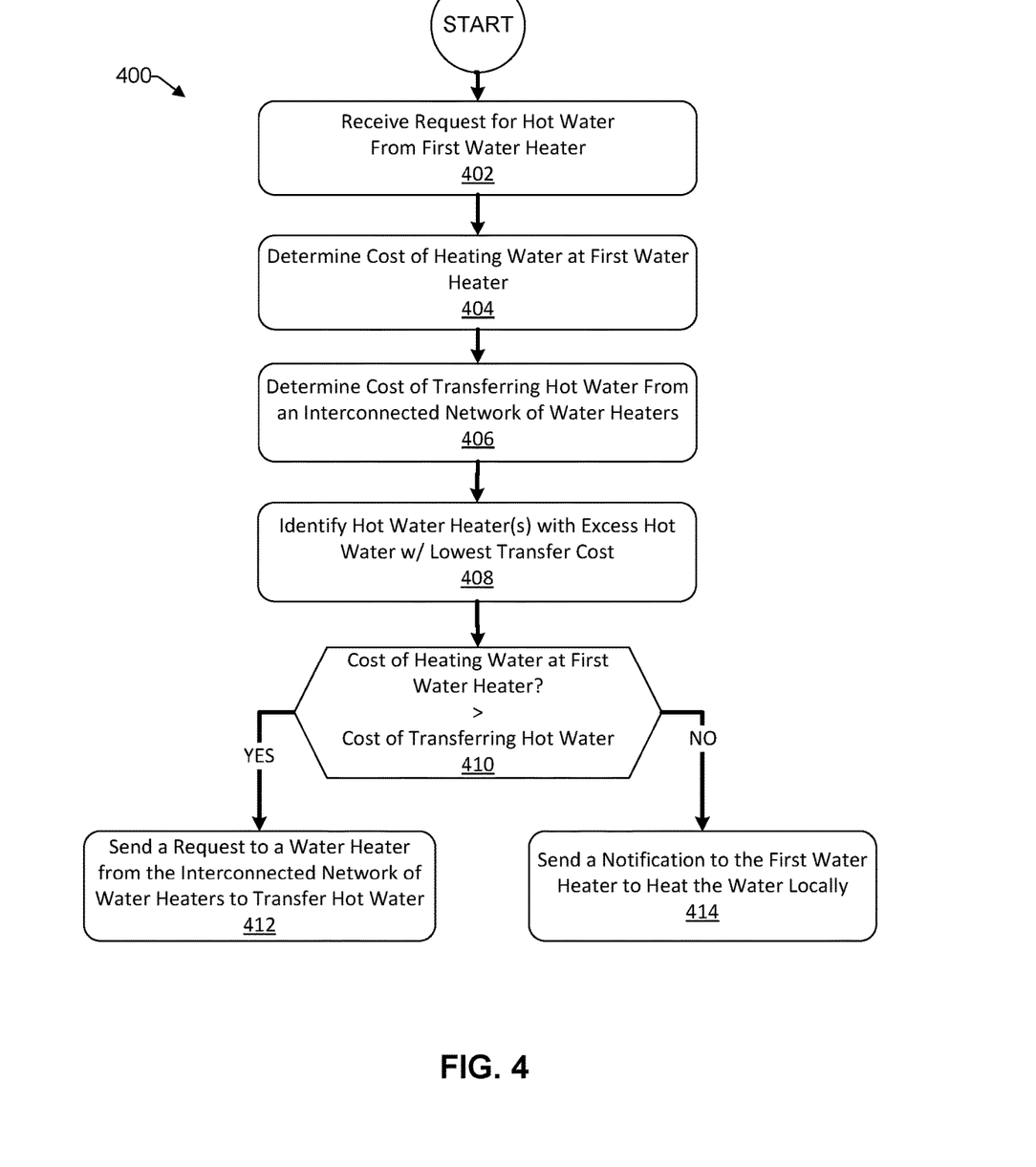
FIG. 4 presents an illustrative process for providing hot water in an energy efficient way via a network of interconnected water heaters.

With the foregoing overview of the architecture 100, the components of the controller device 200, and the example system of interconnected water heaters 300, it may be helpful now to consider a high-level discussion of an example process. To that end, FIG. 4 presents an illustrative process 400 for providing hot water in an energy efficient way via a network of interconnected water heaters. Process 400 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1.

At block 402, the hot water management engine 103 of the central server 108 receives a request for hot water from a first water heater (e.g., the requestor). This request may be received as a data packet that may include a combination of an identifier of the first water heater 102(1), a time stamp, and/or a volume of the requested hot water. This data is stored in a memory of the central server 108. For example, the first water heater 102(1) may have an upper thermostat and a lower thermostat. The volume of hot water that is requested may be based on the temperature of the upper thermostat and the delta in temperature between the upper thermostat and the lower thermostat.

At block 404, the hot water management engine 103 determines a cost of heating the volume of requested water in the first water heater to a predetermined temperature (e.g., 49° C. (120° F.)). For example, the temperature of the water of the first water heater 102(1) and the volume of water that is to be heated is determined (e.g., from the received data packet). Consequently, the amount of energy that would be needed to heat the volume of the water of the first water heater to a predetermined temperature is calculated.

At block 406, the cost of transferring hot water from a water heater (from the network of interconnected water heaters 132) to the first water heater is determined. For example, it is determined by the hot water management engine 103 which water heaters have excess hot water. This determination may be based on stored information or upon a status request sent to the controller devices in the network of interconnected water heaters 132. For each water heater that has indicated that they have an excess of hot water, the temperature of the water, the volume of the available hot water, and the amount of energy to transport the volume of hot water to the requestor water heater is determined. In one embodiment, the volume of available hot water in a water heater is determined by the temperature at the top and bottom of the water heater.

The amount of energy to transport the volume of hot water to the requestor water heater may be different with respect to each water heater that is identified to have excess hot water. In this regard, the distance in each dimension (i.e., X, Y, and Z) between the transferor water heater (e.g., 102($n$)) and the requestor water heater (e.g., 102(1)) is determined. For example, longer distance segments in the same dimension may require more energy than shorter distances. Further, as mentioned previously, a distance segment that is in the vertically up direction is associated with a substantially larger energy loss than that of a vertically down segment. In various embodiments, the coordinates of the requestor and transferor water heaters may be provided in the data packets from the water heaters, respectively, and/or from the subscriber database 110 as contextual information 112. Thus, the hot water management engine 103 may retrieve such contextual information 112 from the subscriber database 110 to determine the cost of transferring the hot water from each hot water heater that has been identified to have excess hot water.

In one embodiment, the energy loss due to the heat dissipation via conduction in the pipes is calculated. This loss of energy may be accounted for in several ways. For example, the loss of energy due to heat loss during the transfer may be calculated as part of the overall cost of transferring the hot water from the transferor to the requestor. Alternatively, this loss of energy due to heat dissipation in the pipes may be included in a calculation to determine a (e.g., energy) cost to heat up the transferred water to the predetermined temperature by the requestor water heater.

In some scenarios, a water heater that is identified to have excess hot water may not have the requested volume of water. For example, the requestor water heater 102(1) may have requested 20 gallons, while the transferor water heater 102($n$) may only have 10 gallons of excess hot water. In various embodiments, several water heaters that have been identified to have excess hot water may be used as transferors (e.g., in series or in parallel), or a single transferor water heater may be used and the remaining water (i.e., 2 gallons in this example) may be heated at the requestor water heater 102(1). The criteria used for such selection may be in consideration of the lowest net (e.g., energy) cost to fulfill the request for the specified volume of hot water.

At block 408, the hot water management engine 103 identifies the hot water heater having excess hot water, of the network of interconnected water heaters 132, which has the lowest cost of transferring the hot water. In one embodiment, when several water heaters that have excess hot water have the same lowest cost of transferring the hot water, then the hot water heater is chosen randomly from the ones having the lowest cost. As mentioned previously, if a water heater that has excess hot water does not have sufficient hot water to meet the requested volume, multiple transferor water heaters may be selected, unless it is determined by the hot water management engine 103 that it is lower in (e.g., energy) cost to heat the remaining volume at the requestor water heater. Thus, the cost for each water heater having excess hot water may be based on the (e.g., energy) cost of transport plus the cost of heating the transported and/or remaining amount to the specified temperature. The one or more water heaters that are identified to have the lowest (e.g., energy) cost are referred to herein as the transferor water heater(s).

At block 410, the hot water management engine 103 determines whether the (e.g., energy) cost of transferring the hot water from the transferor water heater (e.g., 102($n$)) is lower than the cost of heating the water at the requestor water heater 102(1).

Upon determining that the cost of transferring the water from the transferor water heater is lower than the cost of heating the water of the first water heater (i.e., "YES" at decision block 410), the process continues with block 412, where a request is sent in a form of a data packet to the controller 104($n$) of the transferor water heater 102($n$) to provide the volume of excess hot water to the first water heater. Similarly, a notification in the form of a data packet is sent to the controller device 104(1) of the first (i.e., requestor) water heater 102(1) that it will be the recipient of excess hot water from the transferor hot water heater 102($n$).

Returning to block 410, upon determining that the cost of transferring the water from the transferor water heater is equal to or higher than the cost of heating the water of the first water heater (i.e., "NO" at decision block 410), the process continues with block 414, where a notification in the form of a data packet is sent to the first water heater 102(1) to heat the volume of water locally in the first water heater.

Example Calculations

It may now be helpful to provide some calculations by way of a practical example. For discussion purposes, the calculations are with reference to the architecture 100 of FIG. 1. Consider the first water heater 102(1) heating 50 gallons of water to 49° C., but not using the entire volume of heated water. In one embodiment, the controller device 104(1) sends a notification (e.g., in the form of a push data packet) to the hot water management engine 103 of the central server 108 informing that it has a volume (e.g., 30 gallons) of excess hot water. In other embodiments, the hot water management engine 103 sends out a status request (e.g., in the form of a pull data packet) to each water heater in the network of interconnected water heaters 132 at predetermined intervals or when a request for hot water arrives from one of the water heaters 102(1) to 102($n$). A "push" communication is one in which the central server 108 has data to send and initiates the communication session and transmission of the data to the controller device. In contrast, with "pull" communication, the request for the transmission of information is initiated by the client (e.g., controller device).

Consider now that a second water heater 102(2) is requesting 30 gallons of water at 49° C. However, by this time, the 30 gallons of hot water from the first water heater 102(1) may have cooled to 40° C. To simplify the calculation, we will assume that the network of interconnected water heaters transfers (e.g., pumps) these 30 gallons of hot water from the first water heater 102(1) to the second water heater 102(2), and 30 gallons of cold water from the second water heater 102(2) to the first water heater 102(1), in 30 seconds and with a rise of 3 meters each way; this may result in a cost in energy of about 2.06e-3 kWh. We may also assume that in the process of transferring the hot water, 3 of the 30 gallons of hot water mix with 3 gallons of cold water, cooling the 30 gallons of hot water to 37.9° C. We may also assume that the transfer of the hot water results in another 2° C. loss in temperature due to heat loss to the pipes (e.g., via conduction), resulting in an available water hot water temperature of the 30 gallons of 35.9° C. If the second water heater 102(2) then heats these 30 gallons at 36.3° C. to 49° C., this may have a cost in energy of about 0.961 kWh.

Alternatively, the 30 gallons of water may be heated locally at the second water heater 102(2) (without any water transfer) from 20° C. to 49° C., which may have a cost in energy of about 2.134 kWh. In this example, the owners of the second water heater 102(2) would save around 1.2 kWh of energy. According to at least one estimate of the average household energy usage, applicants have determined that by virtue of using the concepts discussed herein, an over 10% savings in energy cost may be achieved for an average two bedroom housing unit.

Example Computer Platform

Figure 5:
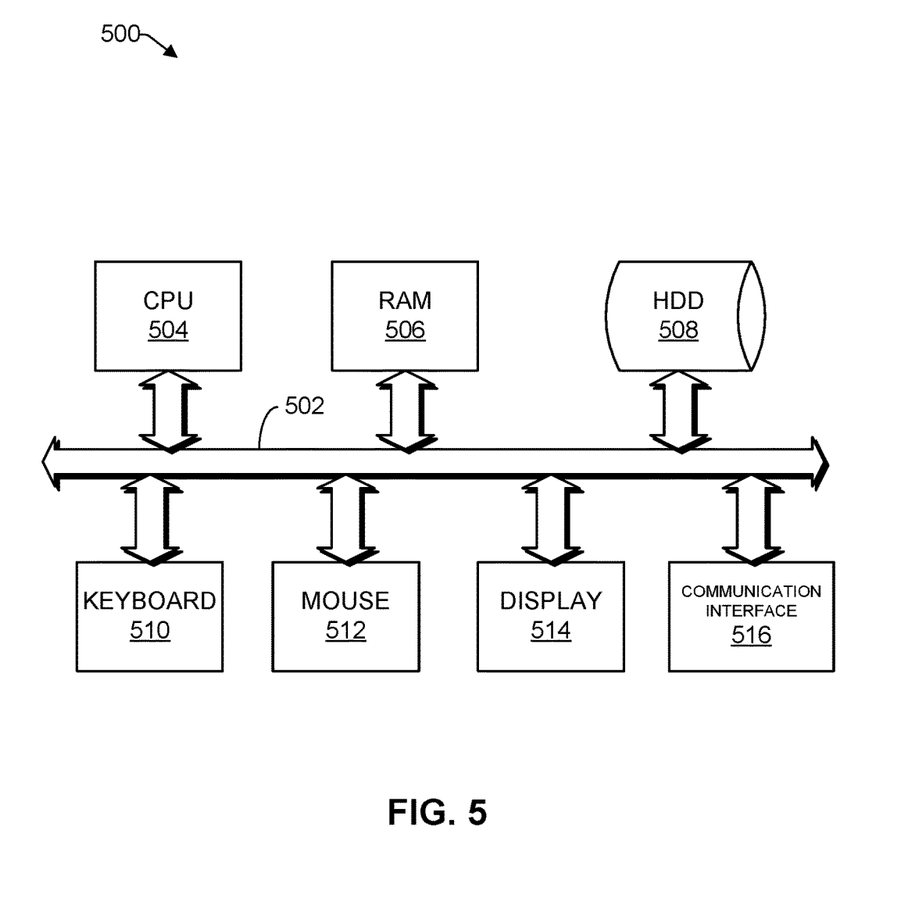
FIG. 5 provides a functional block diagram illustration of a general purpose computer hardware platform.

As discussed above, functions relating to energy efficient distribution of hot water can be performed with the use of one or more computing devices connected for data communication via wireless or wired communication, as shown in FIGS. 1 and 3 and in accordance with the process of FIG. 4. FIG. 5 provides a functional block diagram illustration of a general purpose computer hardware platform. In particular, FIG. 5 illustrates a network or host computer platform 500, as may typically be used to implement a server, such as the central server 108, subscriber database server 110, CRM server 118, or a computing device 120 of FIG. 1. It is believed that those skilled in the art are familiar with the structure, programming, and general operation of such computer equipment and as a result, the drawings should be self-explanatory.

The computer platform 500 may include a central processing unit (CPU) 504, random access memory (RAM) 506, a hard disk drive (HDD) 508, a keyboard 510, a mouse 512, and display 514, which are connected to a system bus 502.

In one embodiment, the HDD 508, has capabilities that include storing a program that can execute various processes, such as the hot water management engine described herein. For example a program, such as Apache™, can be stored for operating the system as a Web server. In an embodiment of the present disclosure, the HDD 508 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
   a processor;
   a network interface coupled to the processor;
   a storage device for content and programming coupled to the processor;
   an application stored in the storage device, wherein an execution of the application by the processor configures the computing device to perform acts comprising:
   receiving a request for a volume of hot water for a first water heater;
   determining a cost of heating a volume of water of the first water heater to a predetermined temperature in the first water heater;
   determining a cost of transferring the volume of hot water from a second water heater of a network of interconnected water heaters to the first water heater;
   upon determining that the cost of transferring the volume of hot water from the second water heater is lower than the cost of heating the volume of water in the first water heater:
      sending a request to the second water heater to transfer at least part of the volume of hot water to the first water heater;
      sending a notification to the first water heater indicative that the first water heater will receive the at least part of the volume of hot water from the second water heater; and
      upon determining that the second water heater does not have enough hot water to accommodate the request for the volume of hot water, sending a notification to the first water heater that a remaining part of the volume of hot water will not be transferred and to heat the remaining part of the volume of hot water in the first water heater; and
   upon determining that the cost of transferring the hot water from the second water heater is equal to or higher than the cost of heating the volume of water of the first water heater, sending a notification to the first water heater to heat the volume of water of the first water heater to the predetermined temperature.

2. The computing device of claim 1, wherein determining the cost of heating the water in the first water heater comprises:
   determining a temperature of the volume of water of the first water heater; and
   determining an amount of energy calculated to heat the volume of water of the first water heater to the predetermined temperature.

3. The computing device of claim 1, wherein determining the cost of transferring the hot water from the second water heater to the first water heater comprises:
   identifying one or more water heaters of the network of interconnected water heaters that have excess hot water;
   determining a temperature of excess hot water of the one or more water heaters that have been identified to have excess hot water;
   calculating, for each water heater that has been identified to have excess hot water, a first amount of energy to transfer the volume of hot water to the first water heater;
   determining, for each water heater that has been identified to have excess hot water, a second amount of energy to heat the transferred volume of hot water to the predetermined temperature by the first water heater; and
   identifying a water heater from the one or more water heaters that have been identified to have excess hot water, which has a smallest total of the first and the second amount of energy, to be the second water heater.

4. The computing device of claim 3, wherein determining the cost of transferring the hot water from the second water heater to the first water heater further comprises determining a volume of the excess hot water from the one or more hot water heaters that have been identified to have excess hot water.

5. The computing device of claim 3, wherein the first amount of energy includes an amount of heat energy that is lost due to conduction to a pipe during the transfer of the volume of hot water to the first water heater.

6. A computing device comprising:
a processor;
a network interface coupled to the processor;
a storage device for content and programming coupled to the processor;
an application stored in the storage device, wherein an execution of the application by the processor configures the computing device to perform acts comprising:
receiving a request for a volume of hot water for a first water heater;
determining a cost of heating a volume of water of the first water heater to a predetermined temperature in the first water heater;
determining a cost of transferring the volume of hot water from a second water heater of a network of interconnected water heaters to the first water heater;
upon determining that the cost of transferring the volume of hot water from the second water heater is lower than the cost of heating the volume of water in the first water heater:
sending a request to the second water heater to transfer at least part of the volume of hot water to the first water heater;
sending a notification to the first water heater indicative that the first water heater will receive the at least part of the volume of hot water from the second water heater; and
upon determining that the second water heater does not have enough hot water to accommodate the request for the volume of hot water, sending a request to a third water heater in the network of interconnected water heaters that has excess hot water to transfer a remaining volume of hot water to the first water heater; and
upon determining that the cost of transferring the hot water from the second water heater is equal to or higher than the cost of heating the volume of water of the first water heater, sending a notification to the first water heater to heat the volume of water of the first water heater to the predetermined temperature.

7. The computing device of claim 1, wherein the execution of the application further configures the computing device to perform acts comprising receiving from each water heater of the network of interconnected water heaters a status notification as to whether excess hot water is available.

8. The computing device of claim 7, wherein the status notification is received from each water heater of the network of interconnected water heaters at periodic intervals.

9. The computing device of claim 7, wherein, for each water heater of the network of interconnected water heaters, the status notification is received when a controller device of a corresponding water heater determines that the corresponding water heater has excess hot water.

10. The computing device of claim 7, wherein the status notification is received in response to receiving the request for the volume of hot water for the first water heater.

11. A non-transitory computer readable storage medium tangibly embodying a computer readable program code having computer readable instructions which, when executed, causes a computer device to carry out the steps of a method for fulfilling a request for a volume of hot water, the method comprising:
receiving a request for the volume of hot water for a first water heater;
determining a cost of heating a volume of water of the first water heater to a predetermined temperature in the first water heater;
determining a cost of transferring the volume of hot water from a second water heater of a network of interconnected water heaters to the first water heater;
upon determining that the cost of transferring the volume of hot water from the second water heater is lower than the cost of heating the volume of water in the first water heater:
sending a request to the second water heater to transfer at least part of the volume of hot water to the first water heater;
sending a notification to the first water heater indicative that the first water heater will receive the at least part of the volume of hot water from the second water heater; and
upon determining that the second water heater does not have enough hot water to accommodate the request for the volume of hot water, sending a request to a third water heater in the network of interconnected water heaters that has been identified to have excess hot water to transfer a remaining volume of hot water to the first water heater; and
upon determining that the cost of transferring the hot water from the second water heater is equal to or higher than the cost of heating the volume of water of the first water heater, sending a notification to the first water heater to heat the volume of water of the first water heater to the predetermined temperature.

12. The non-transitory computer readable storage medium of claim 11, wherein determining the cost of heating the water in the first water heater comprises:
determining a temperature of the volume of water of the first water heater; and
determining an amount of energy calculated to heat the volume of water of the first water heater to the predetermined temperature.

13. The non-transitory computer readable storage medium of claim 11, wherein determining the cost of transferring the hot water from the second water heater to the first water heater comprises:
identifying one or more water heaters of the network of interconnected water heaters that have excess hot water;
determining a temperature of the excess hot water of the one or more water heaters that have been identified to have excess hot water;
calculating, for each water heater that has been identified to have excess hot water, a first amount of energy to transfer the volume of hot water to the first water heater;
determining, for each water heater that has been identified to have excess hot water, a second amount of energy to heat the transferred volume of water to the predetermined temperature by the first water heater; and
identifying a water heater from the one or more water heaters that have been identified to have excess hot water, which has a smallest total of the first and the second amount of energy, to be the second water heater.

14. The non-transitory computer readable storage medium of claim 13, wherein determining the cost of transferring the hot water from the second water heater to the first water heater further comprises determining a volume of the excess hot water from the one or more hot water heaters that have been identified to have excess hot water.

15. The non-transitory computer readable storage medium of claim 13, wherein calculating the first amount of energy includes an amount of heat energy that is lost due to conduction to a pipe during the transfer of the volume of hot water to the first water heater.

16. The non-transitory computer readable storage medium of claim 11, wherein upon determining that the cost of transferring the volume of hot water from the second water heater is lower than the cost of heating the volume of water in the first water heater, the method further comprises:
   upon determining that the second water heater does not have enough hot water to accommodate the request for the volume of hot water, sending a notification to the first water heater that a remaining part of the volume of hot water will not be transferred and to heat the remaining part of the volume of hot water in the first water heater.

17. The non-transitory computer readable storage medium of claim 11, wherein the method further comprises receiving from each water heater of the network of interconnected water heaters a status notification as to whether excess hot water is available.

\* \* \* \* \*